United States Patent [19]

Gildas

[11] Patent Number: 4,817,755

[45] Date of Patent: Apr. 4, 1989

[54] SUSPENDED STRUCTURE FOR COUPLING SEISMIC SOURCES TO THE WALLS OF A BOREHOLE

[75] Inventor: Omnes Gildas, L'Hay-les-Roses, France

[73] Assignee: Compagnie Generale De Geophysique, Massy Cedex, France

[21] Appl. No.: 20,965

[22] Filed: Mar. 3, 1987

[30] Foreign Application Priority Data

Mar. 3, 1986 [FR] France ................................ 8602920

[51] Int. Cl.[4] ................................ G01V 1/40

[52] U.S. Cl. ................................ 181/106; 181/104; 367/911

[58] Field of Search .................. 102/312, 313; 166/66, 166/74, 119, 131, 192, 193, 228, 229; 175/4.52; 181/102, 103, 104, 105, 106, 108, 110, 111, 113, 115, 116, 117, 118, 119, 120, 401, 402; 367/25, 50, 57, 86, 140, 141, 142, 143, 144, 145, 146, 147, 176, 911, 912

[56] References Cited

U.S. PATENT DOCUMENTS

| | | | |
|---|---|---|---|
| 2,889,774 | 6/1959 | Allen | 175/4.52 |
| 3,056,463 | 10/1962 | Summers | 367/912 X |
| 3,118,374 | 1/1964 | Karpovich | 102/313 |
| 3,357,504 | 12/1957 | Calhoun | 166/63 |
| 3,532,182 | 10/1970 | Bouyoucos | 181/0.5 |
| 3,598,199 | 8/1971 | Merterm | 181/0.5 |
| 3,637,020 | 1/1972 | McLamore | 102/313 X |
| 3,690,378 | 9/1972 | Land | 166/63 X |
| 4,039,042 | 8/1977 | Edwards et al. | 181/106 |
| 4,164,727 | 8/1979 | Morris | 181/0.5 X |
| 4,184,562 | 1/1980 | Bakamjian | 181/104 |
| 4,611,685 | 9/1986 | Curran | 181/102 |
| 4,671,379 | 6/1987 | Heawed et al. | 181/113 X |
| 4,722,417 | 2/1988 | Selsam | 367/912 |

FOREIGN PATENT DOCUMENTS

| | | |
|---|---|---|
| 1577603 | 8/1969 | France . |
| 2408964 | 8/1979 | France . |

*Primary Examiner*—Brian S. Steinberger
*Attorney, Agent, or Firm*—Blakely, Sokoloff, Taylor & Zafman

[57] ABSTRACT

A suspended structure for coupling a seismic source to the walls of a borehole, in particular for underground prospecting purposes, the structure comprising top (14) and bottom (16) elongate plug elements having transverse dimensions substantially equal to the inside dimensions of the borehole (10), defining therebetween a substantially closed space (32), and suspension elements (30, 50) connecting the bottom plug element to the top plug element without isolating said space from the surrounding walls of the borehole, a seismic source (34) suitable for acting in said space, with the top and bottom plug elements opposing said action in the longitudinal direction of the borehole so that said action is applied essentially against the walls (10) of the borehole level with said space.

Applicable to underground prospecting together with pick-up means.

13 Claims, 5 Drawing Sheets

FIG_1

FIG_2

SUSPENDED STRUCTURE FOR COUPLING SEISMIC SOURCES TO THE WALLS OF A BOREHOLE

The present invention relates generally to seismic sources for prospecting underground, and relates in particular to a suspended structure for coupling seismic sources to the walls of a borehole.

BACKGROUND OF THE INVENTION

In some seismic prospection methods, a seismic source is disposed in a borehole and the source is excited at given depths in order to produce well-determined acoustic waves in the adjacent underground formations, and a set of sensors is used, either spread over the surface of the ground or else disposed in other adjacent boreholes, in order to pick up acoustic information for analysis purposes after it has propagated through and been reflected from geological formations.

In the prior art, when a seismic source is deployed in a borehole, no special precautions have been taken with respect to the source concerning the way in which it is coupled to the geological formations situated at the same depth.

In particular, regardless of the type of source used, the acoustic wave(s) developed by exciting the source act both sideways towards said geological formations and upwardly and downwardly along the borehole in the form of compression waves and/or tube waves. This upwardly and downwardly propoagating acoustic energy sets up interference noise phenomena in the adjacent geological formations, and this noise is picked up by the sound sensors for providing the signals to be analyzed.

Further, for economic reasons, it is desirable to optimize the quantity of acoustic energy which is applied to the geological formations concerned. Thus, since a generally very large fraction of the acoustic energy propagates vertically along the borehole without substantial effect on the geological formation, it is necessary in practice, to repeat sound emission a large numer of times, and this is disadvantageous.

The object of the present invention is to mitigate these drawbacks and to provide a structure for confining the acoustic energy produced by the source, when excited, against the walls of the borehole at the depth of said source.

SUMMARY OF THE INVENTION

To this end, the present invention provides a suspended structure for coupling a seismic source to the walls of a borehole, in particular for underground prospecting purposes, the structure comprising top and bottom elongate plug elements having transverse dimensions substantially equal to the inside dimensions of the borehole, defining therebetween a substantially closed space, and suspension elements connecting the bottom plug element to the top plug element without isolating said space from the surrounding walls of the borehole, a seismic source suitable for acting in said space, with the top and bottom plug elements opposing said action in the longitudinal direction of the borehole so that said action is applied essentially against the walls of the borehole level with said space.

Thus, by virtue of their inertia and of their length, the plug elements confine the acoustic energy generated by exciting the source to said space and prevent it from propagating along the borehole, thereby increasing the fraction of useful sound and eliminating a large portion of interfering noise.

Preferably, the top and bottom plug elements are metal cylinders and include means for absorbing acoustic energy.

Thus, those acoustic waves which are emitted vertically from the source are further attenuated by the damping effect of the absorption means, with the absorption means also contributing to attenuating resonance waves which may appear in a borehole.

BRIEF DESCRIPTION OF THE DRAWINGS

Embodiments of the invention are described, by way of example, with reference to the accompanying drawing, in which.

MORE DETAILED DESCRIPTION

Figure 1:
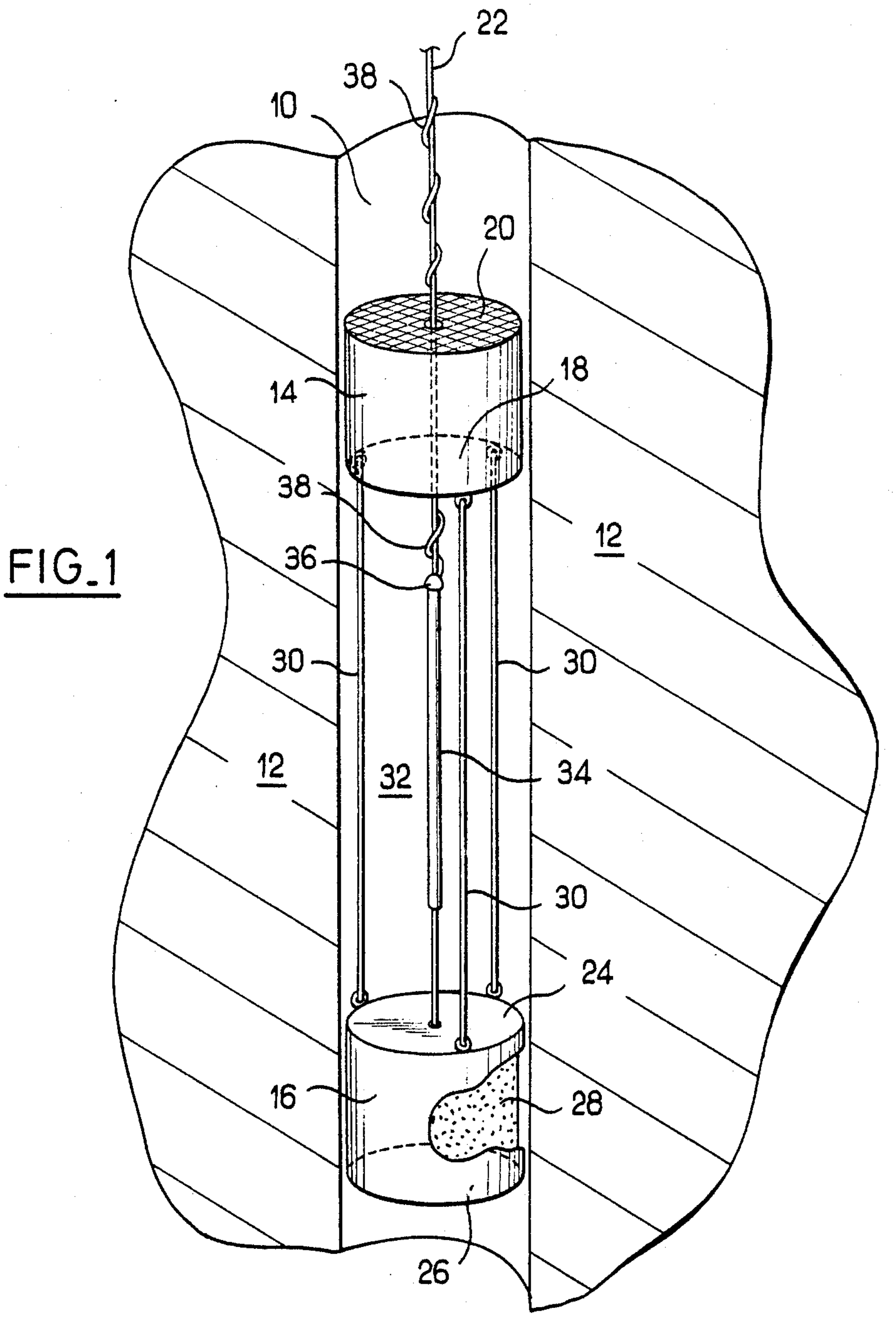
FIG. 1 is a vertical axis section view through a first embodiment of the invention.

With reference initially to FIG. 1, a borehole intended for use with a seismic source at various depths is designated by reference 10, and the geological formation in which the borehole is made is referenced 12.

A suspended structure in accordance with a first embodiment of the invention comprises, going downwardly, two cylindrical elements or boxes, namely a top box 14 and a bottom box 16. The bottom end of the top box 14 is closed by a solid circular plate 18 while its top end is closed by a perforated plate such as a grating or the like, which is likewise circular and which is referenced 20. The diameter of the cylinders is chosen so that they plug the borehole as much as possible at their respective depths while not hindering vertical maneuvers of the suspended structure in the borehole.

The bottom end of a suspension cable 22 is attached to the top cylinder 14, preferably via its bottom closure plate by means not shown.

In a similar manner, the bottom cylinder 16 is closed at its top end by a solid circular plate 24 and at its bottom end by a grating 26 (not visible in the figure) analogous to the grating 20.

Both cylinders 14 and 16 are filled with a foam of plastic material, as shown at 28 for the bottom cylinder.

Suspension elements, for example three metal cables 30 in the present example, extend between the bottom end of the top cylinder 14 and the top end of the cylinder 16, with the suspension elements being attached at regular intervals around the peripheries thereof. The method of connecting these cables 30 to the cylinders is not described since it may be any method considered appropriate the person skilled in the art. The cylinder 16 is thus suspended from the cylinder 14 which is in turn suspended from the cable 32, thereby defining a suspended structure for use in seismic source firing operations for the purposes of underground prospecting.

The two cylinders 14 and 16 are thus vertically separated by a predetermined height and they plug the borehole so as to define an inbetween working space 32. The sides of the space are delimited by the walls of the borehole 10, while the top and bottom of the space are delimited by the solid plates 18 and 24 of the top and bottom cylinders. The presence of the cables between the space 32 and the walls of the borehole can be considered negligible, as shown in detail below.

A seismic source is capable of being excited so as to operate within the space 32. In the present example, the primary source consists in a primacord fuse 34 which is conventionally constituted by a core of explosive material with a predetermined mass per unit length, and surrounded by a sheath. A firing cap 36 is provided at the top end of the fuse 34 and may be set off at a determined instant from the surface by means of an electric cable 38 running along the suspension cable 22.

When the suspended structure in accordance with the invention is used to set up successive seismic shocks at different depths down a borehole, it is advantageous to use a mechanism suitable for paying out primacord fuse from a continuous roll. A predetermined length of fuse is thus paid out after each explosion under appropriate remote-control from the surface, in preparation for the next excitation. Such a mechanism may be received in one or other of the two cylinders 14 and 16.

When the seismic source 34 is excited, as described above, it creates a three-dimensional acoustic shock wave in the space 32. The vertical components of this wave encounter the solid surfaces (the closure plates 18 and 24) of the top and bottom cylinders 14 and 16, which surfaces oppose propagation of said waves along the vertical space constituted by the borehole by virtue of their inertia and by the absorption effect of the foam 28 contained in each of the cylinders.

The gratings 20 and 26 serve to hold the blocks of absorbent foam 28 in place while still allowing communication between the inside volume of each of the cylinders 14 and 16 and the borehole beyond the cage so as to enable the foam to provide an acoustic damping effect on the tube waves which might otherwise appear in said borehole.

Consequently, the major portion of the acoustic energy created by exciting the source is confined in a relatively uniform manner to the side walls of the working space, i.e. to the adjacent geological formation. This improves the directivity of the seismic source, and thus improves its coupling with the geological formation surrounding it, while avoiding the interference phenomena which could be set up by the wave propagating longitudinally along the borehole. It may be observed here that the suspension cables 30 which are of small transverse dimensions constitute substantially no obstacle to said sideways action of the seismic source.

In the present embodiment, the suspended cage structure is made of steel. The pltes 18 and 24 and the gratings 20 and 26 may be fixed to the ends of the cylinders by welding.

Figure 2:
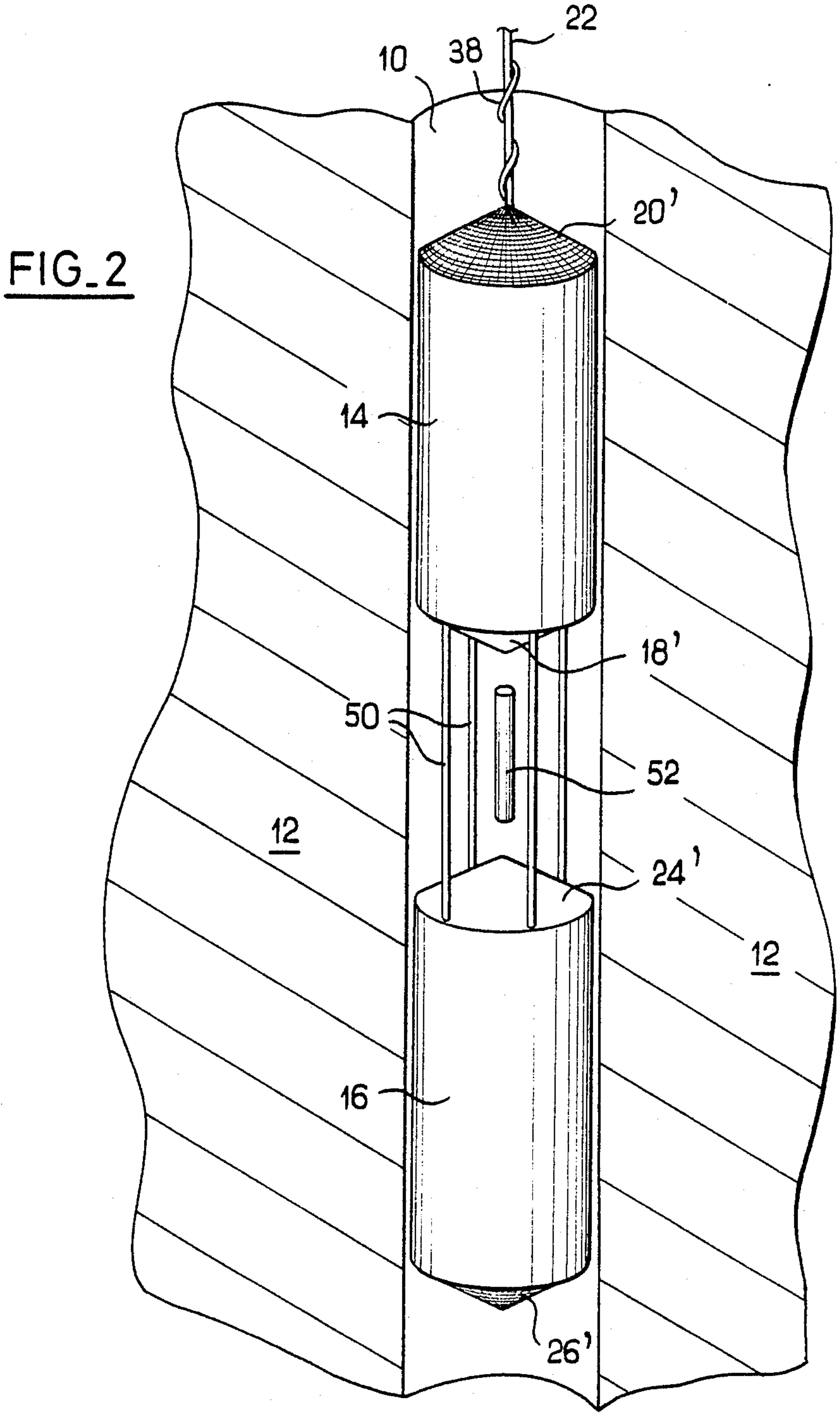
FIG. 2 is an axial vertical section view through a second embodiment of the invention.

FIG. 2 shows a variant embodiment of the invention. In this figure the elements or parts which are similar to those of FIG. 1 are designated by the same reference numerals.

The suspended structure in this variant comprises a top cylinder 14 and a bottom cylinder 16 which define a closed space 32 therebetween. In this case the two cylinders are interconnected by rigid bars 50, made of steel, for example.

As can be seen, the top and bottom walls of each cylinder 14 and 16 are conical in shape having an angle at the apex of about 120°.

In the same manner as described above, the outer walls 20' and 26' of the cylinders are made of gratings or similar structures, whereas the inner walls 18 and 24 vertically delimit the working space 32 and are solid so that they close the borehole at their own depths.

As in the previous embodiment, (but not illustrated) the cylinders are filled with absorbent foam.

In this embodiment the suspended structure includes a seismic source referenced 52 which extends axially and which is suitable for acting over 360° in the radial direction. This source may be selected from a variety of possible sources mentioned below.

The conical shape of the end surfaces of the cylinders has a first purpose of facilitating vertical displacement of the suspended structure along the borehole, and in particular of facilitaing the flow of mud present in the borehole between the cylinders and the walls of the borehole.

In addition, the conical shape is intended to reduce the mechanical force exerted by the application of the shock wave to the cylinders when the seismic source is excited. The slope of the surfaces exposed to the working space contributes to reflecting a portion of the received acoustic energy sideways towards the adjacent geological formation. In combination with the above-mentioned absorption effect obtained by the foam, this technique minimizes the transmission of acoustic energy in the longitudinal direction along the borehole.

Further, when using a seismic source which makes use of high-pressure gas charges, the above-mentioned conical shape encourages the removal of the bubbles formed in the mud upwardly along the borehole, with said removal being necessary in order to obtain a satisfactory seismic shock next time the source is used.

It should be observed that the use of rigid bars 50 in this embodiment instead of the suspension cables 30 shown in FIG. 1 has the advantage of allowing implosion-type seismic sources to be used without tending to move the two cylinders towards each other in an undesirable manner under the effect of a sudden drop in pressure created by exciting this type of source.

Naturally, the present invention is not limited to the embodiments described and shown, but includes any variant or modification within the spirit of the invention.

In particular, the portion via which the bottom box is suspended from the top box could be constituted by any type of open structure, such as bars, cables, or gratings, in any appropriate number and density.

Further, any known type of conventional source may be used in the suspended structure, the source may be implosive or explosive and preferably extends axially to operate over 360° in the radial direction. In particular, the following types of source may be used: a water gun, a gun for setting of a burst of explosive charges, a sparker, or a "mini-sleeve," i.e. an expanding air sleeve-type source. The top and/or bottom cylinder(s) could then be specially arranged to receive all or part of the mechanism of the source, provided, of course, that the source is designed to act in the space 32 between said cylinders.

The damping of the acoustic energy which tends to propagate in the vertical direction along the borehole may be further improved, while retaining or omitting the damping by absorbent foam as described above, by ensuring that the top and bottom cylinders have very high inertia. They may therefore be at least partially made of solid metal.

In general, the two cylinders should have substantially identical inertia in order to prevent the entire suspended structure from having a tendency to move upwards or downwards each time the source is excited.

Further, the structure may be fitted with any other type of device for damping or absorbing the lost energy which is applied to the inside ends of the two cylinders.

Figure 3:
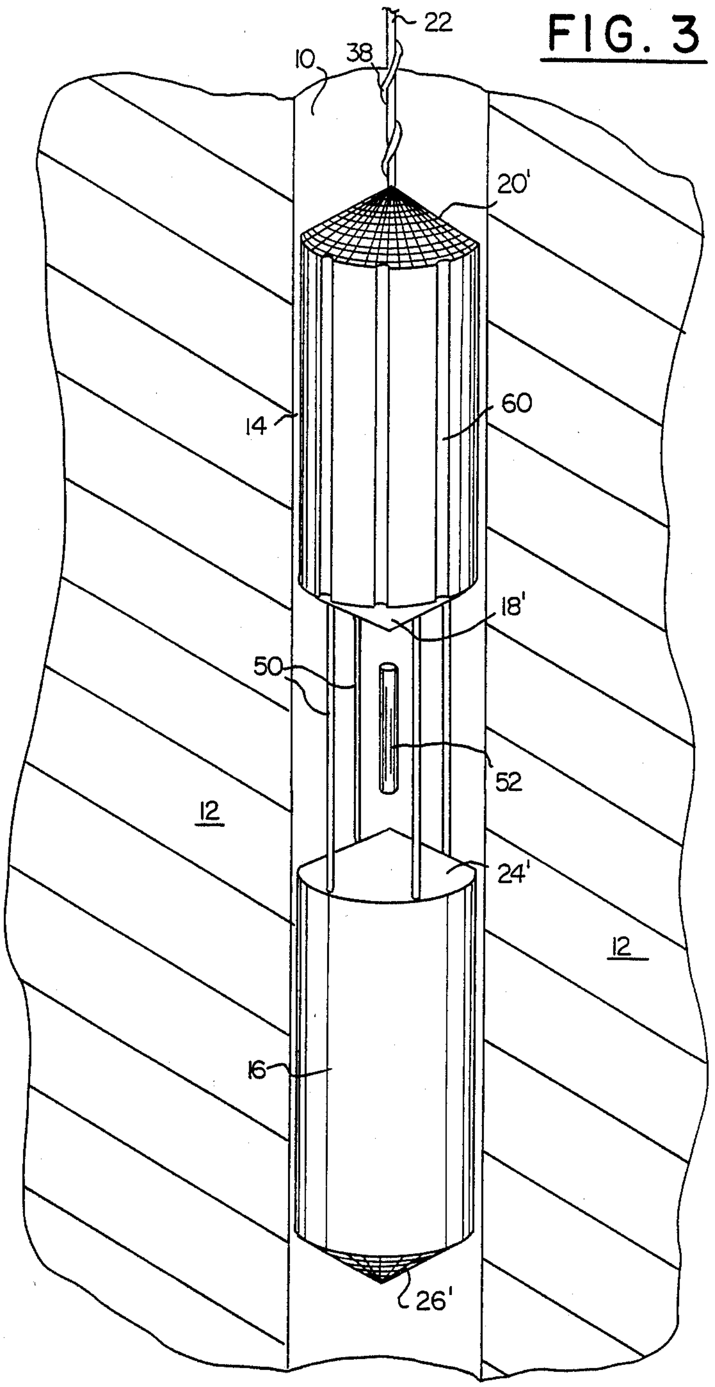
FIG. 3 is an axial vertical section view showing vertical fluting incorporated on a second embodiment of the invention.
Figure 4:
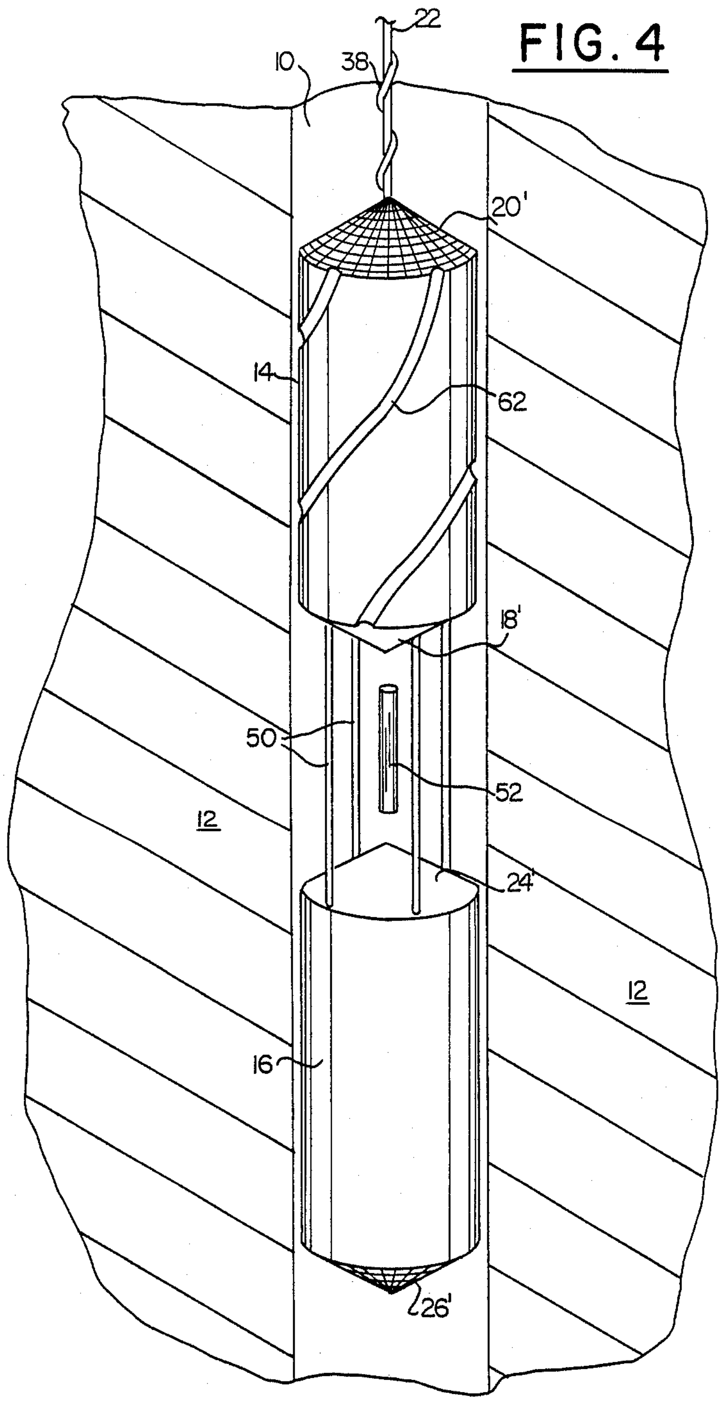
FIG. 4 is an axial vertical section view showing helical grooves incorporated on a second embodiment of the invention.

For example as, shown in FIGS. 3 and 4, vertical fluting 60 or helical grooves 62 may be provided in the outside surfaces of the cylinders in order to evacuate air bubbles created when the source is excited, and this may be done without compromising the coupling to the walls of the borehole.

Figure 5:
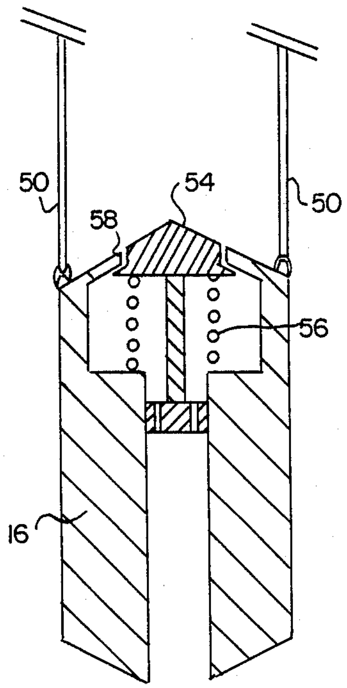
FIG. 5 is a cutaway view showing a valve member incorporated on a second embodiment of the invention.

Another solution may consist in providing a valve member inside each cylinder in the vicinity of its end facing the working space, said valve member responding to the pressure set up by the source being excited to move away from its seat and establish fluid communication with the borehole beyond the structure via an appropriate internal passage. For example, as shown in FIG. 5, return means such as spring 56 is provided to return valve members 54 against it's seat 58.

The valve members are preferably made of metal and have high inertia.

Further, regardless of the absorption means provided, the two cylinders should behave substantially symmetrically when the source is excited in order to limit the algebraic sum of the vertical forces applied to the structure to a reasonable value.

Finally, it may be observed that improving the coupling between the seismic source and the surrounding underground formations makes it possible to use seismic signals having very much simpler waveforms, which is advantageous both from the technical point of view and from the economic point of view.

I claim:

1. A suspended structure for use in a borehole in the ground in conjunction with an acoustic phenomenon suitable for generating acoustic waves in said ground for underground prospecting purposes, said structure comprising a first cylindrical element suspended directly over a second cylindrical element, each adapted to absorb at least a substantial part of said acoustic waves and having a diameter less than the diameter of the borehole, and elongated suspension elements having transverse dimensions and connecting the bottom of said first cylindrical element to the top of said second cylindrical element at peripheral zones thereof, said first and second cylindrical elements defining therebetween a space substantially closed at the top of said second cylindrical element and at the bottom of said first cylindrical element thereof and to which the walls of said borehole are exposed and wherein said first and second cylindrical elements are formed within an internal axial passage between said space and said borehole, a valve means being provided in said passage and being normally biased against a seat by a spring and opening for absorbing said acoustic waves and for establishing a fluid communication with the borehole outside the structure when said acoustic waves are generated by said acoustic phenomenon, whereby said acoustic phenomenon generated in said space is prevented from propagating in a longitudinal direction of said borehole and is applied substantially to said walls of said borehole within said space.

2. A structure according to claim 1, wherein said first and second cylindrical elements are hollow, flled with absorbent foam and closed at their ends facing said space by gratings.

3. A structure according to claim 1, wherein said first and second cylindrical elements are metal cylinders.

4. A structure according to claim 1, wherein said first and second cylindrical elements include outside cylindrical surfaces having vertical or helical grooves formed in said outside cylindrical surface for establishing peripheral fluid communication between said space and said borehole outside said structure.

5. A structure according to claim 1, wherein said suspension elements comprise cables.

6. A structure according to claim 1, wherein said suspension elements comprise substantially rigid bars.

7. A suspended structure for use in a borehole in the ground on conjunction with an acoustic phenomenon suitable for generating acoustic waves in said ground for underground prospecting purposes, said structure comprising a first cylindrical element suspended directly over a second cylindrical element, each adapted to absorb at least a substantial part of said acoustic waves and having a diameter less tha the diameter of the borehole, and elongated suspension elements having transverse dimensions and connecting the bottom of said first cylindrical element to the top of said second cylindrical element at peripheral zones thereof, said first and second elements defining therebetween a space substantially closed at the top of said second cylindrical element and at the bottom of said first cylindrical element thereof and to which the walls of said borehole are exposed, whereby said acoustic phenomenon generated in said space is prevented from propagating in a longitudinal direction of said borehole and is applied substantially to said walls of said borehole within said space, wherein said first and second cylindrical elements have conical top and bottom end faces.

8. A structure according to claim 7, wherein said first and second cylindrical elements are hollow, filled with absorbent foam and closed at their ends facing said space by gratings.

9. A structure according to claim 7, wherein said first and second cylindrical elements are metal cylinders.

10. A structure according to claim 7, wherein said first and second cylindrical elements are formed with an internal axial passage between said space and said borehole, a valve means being provided in said passage and being normally biased against a seat by a spring and opening for absorbing said acoustic wave and establishing a fluid communication with the borehole outside the structure when said acoustic wave is generated by said acoustic phenomenon.

11. A structure according to claim 7, wherein said first and second cylindrical elements include outside cylindrical surfaces having vertical or helical grooves formed in said outside cylindrical surface for establishing peripheral fluid communication between said space and said borehole outside said structure.

12. A structure according to claim 7, wherein said suspension elements comprise cables.

13. A structure according to claim 7, wherein said suspension elements comprise substantially rigid bars.

* * * * *

UNITED STATES PATENT AND TRADEMARK OFFICE
CERTIFICATE OF CORRECTION

PATENT NO. : 4,817,755

DATED : 04-04-89

INVENTOR(S) : Gildas

It is certified that error appears in the above-identified patent and that said Letters Patent is hereby corrected as shown below:

| Column | Line | Correction |
|---|---|---|
| 2 | 17 | delete "axis", insert --axial-- |
| 3 | 57 | delete "pltes", insert --plates-- |
| 6 | 26 | delete "tha", insert --than-- |

Signed and Sealed this

Twenty-seventh Day of February, 1990

*Attest:*

JEFFREY M. SAMUELS

*Attesting Officer* *Acting Commissioner of Patents and Trademarks*